United States Patent Office 3,488,281
Patented Jan. 6, 1970

3,488,281
CONTINUOUS FLUIDIZED-BED CATALYTIC
HYDROREFINING
Miloslav Petráček, 4 Kpt. Jarose, Brno, Czechoslovakia;
Zdeněk Kabátek, 29 Sokolska, Prague 2, Czechoslovakia;
and Ladislav Litera, 102a Purkynova; Zdeněk
Tvaruzěk, 4 Republiky; and Frantisek Hájek, 31
Leninova; all of Brno, Czechoslovakia
Continuation-in-part of application Ser. No. 619,256,
Feb. 28, 1967. This application Aug. 2, 1968, Ser.
No. 749,689
Claims priority, application Czechoslovakia,
Mar. 3, 1966, 1,430/66
Int. Cl. C10g 13/18, 13/02, 23/02
U.S. Cl. 208—153                                    10 Claims

ABSTRACT OF THE DISCLOSURE

In the continuous fluidized-bed catalytic hydrorefining and/or catalytic hydrocracking of crude oil, tar, their distillation components and analogous substances, at least one catalyst is continuously admitted into a discrete inlet zone of an enclosed space. The thus-admitted catalyst is continuously transferred into a discrete reaction zone of the enclosed space and moved through this reaction zone from an inlet to an outlet thereof. A substance to be treated by the catalyst is continuosly admitted into the reaction zone and fluidization of the catalyst is continuously effected only during movement of the catalyst through the reaction zone from the inlet to the outlet so that reaction with the substance to be treated takes place in the reaction zone and the catalyst becomes spent. The spent catalyst is continuously transferred from the reaction zone to a discrete discharging zone of the enclosed space, and is discharged from this zone. Thus, the catalyst passes through each of the zones only once during any one processing cycle.

Cross reference to related application

The present application is a continuation-in-part of our earlier filed application, Ser. No. 619,256, filed on Feb. 28, 1967, now abandoned, and entitled "Method and Equipment for the Performance of Continuous Fluid Catalytic Hydrogenation Refining."

Background of the invention

The present invention relates to continuous fluidized-bed catalytic hydrorefining and/or catalytic hydrocracking. More particularly, the invention relates to continuous fluidized-bed catalytic hydrorefining and/or catalytic hydrocracking of crude oil, tar, their distillation components and analogous substances. The invention is concerned with providing a method for these purposes, and with an apparatus for carrying out the method.

Fluidized-bed catalytic reactions as a means for carrying out catalytic hydrorefining and/or catalytic hydrocracking are already known. It is not believed necessary to discuss them in detail. However, it must be pointed out that the methods of this type which are currently known to us suffer from the disadvantage that a certain quantity of the fresh catalyst which is admitted into the reaction vessel will be discharged therefrom after a very short retention time, whereas another quantity of catalyst, but this time spent catalyst, is retained unduly long in the reaction vessel. Thus, the conditions of charging fresh catalyst and discharging spent catalyst are not controllable according to the methods known heretobefore, with the result that the catalytic bed activity in the reactor is unpredictable and below optimum.

In catalytic bed processes of this type it is intended to distribute the catalyst throughout the fluidized bed in accordance with the deactivation rate of the catalyst, that is the rate at which the catalyst becomes spent, in such a manner that the already spent and partly coked catalyst will sink to the bottom of the fluidized bed to be discharged therefrom, whereas fresh catalyst will float at the top levels of the fluidized bed. Theoretically, this should always be possible; under actual working conditions of the known methods, however, this desirable and theoretically obtainable condition has not heretofore been realized. There are various reasons for this, including the fact that new catalyst particles are asymmetrical and of different weight, and that they are contaminated by becoming mixed with the already spent catalyst particles as the reaction process proceeds, particularly in the bottom section of the reaction vessel and during the regeneration process, whereby the circulation of the polluted and contaminated catalyst results in a prolongation of the catalyst retention time with the aforementioned disadvantages.

It is thus an object of the present invention to overcome these disadvantages which have been briefly outlined above.

More particularly, it is an object of the present invention to provide a method of the type in question which provides for optimum utilization of catalyst activity, which therefore assures most economical use of the catalyst and yields high-quality products.

The above objects, and others which will become apparent hereafter, are attained according to the present invention.

Summary of the invention

In accordance with the above and other objects, one feature of our invention resides in the provision of a method for carrying out continuous fluidized-bed catalytic hydrorefining and/or catalytic hydrocracking of crude oil or tar, their distillation components and analogous substances. Our novel method comprises a processing cycle which includes the steps of continuously admitting at least one catalyst into a discrete inlet zone of an enclosed space. The thus-admitted catalyst is continuously transferred into a discrete reaction zone of the enclosed space and is moved through the reaction zone from an inlet to an outlet thereof. A substance to be treated with the catalyst is continuously admitted into the reaction zone and the catalyst is continuously fluidized only during movement thereof through the reaction zone from the inlet to the outlet so that reaction with the substance to be treated takes place in the reaction zone and the catalyst becomes spent. The spent catalyst is continuously transferred from the reaction zone to a discrete discharging zone of the enclosed space from where it is discharged, so that the catalyst passes through the respective zones of the enclosed space only once during this cycle.

The enclosed space is constituted by an upright reactor vessel which is subdivided into the aforementioned discrete zones. In accordance with the invention the catalyst is admitted into the upper end of the inlet zone and is discharged from the lower end of the discharging zone. The fluidizing medium, such as hydrogen or hydrogen-containing gas, is admitted together with the material to be treated at the bottom of the reaction zone for flow in upward direction. This results in the establishment of at least one horizontal fluidized bed. The components in the reaction zone are maintained at a temperature within the range of substantially 200 to substantially 600° C. and at a pressure ranging between substantially 30 and 500 atmospheres. The reaction products are subsequently purged or evacuated from the top of the reaction vessel, that is at the top of the reaction zone. The spent discharged catalyst is regenerated and recycled.

It will be seen that we obtain a controlled retention of the catalyst in the reaction vessel. We obtain this by forcing the catalyst to move in a circumferential path in the upright reaction vessel which is of substantially circular cross-sectional outline. Thus, we are able to force the catalyst to traverse the reaction zone in a substantially controllable manner and within a controllable period of time. Similarly, we force the spent catalyst to leave the reaction zone continuously and to enter the discharging zone which is separate from the reaction zone, and in this discharging zone a continuous discharge of the entire amount of spent catalyst entering the discharging zone takes place. This means that all catalyst particles entering the reaction zone at the inlet thereof are maintained freely floating in the fluidized bed for substantially identical periods of time, and are forced to perform movements which take them over substantially identical paths as each particle moves from the inlet to the outlet of the reaction zone.

It will be appreciated that two or more different catalysts, that is catalysts which differ in their physical and/or chemical properties, may be introduced into the reaction vessel. In this case, a corresponding number of superimposed horizontal fluidized beds are established and maintained in the reaction zone. This does not, however, change the aforementioned facts relative to the motions of each catalyst particle and its retention time. The atmospheric distillation residue hydrorefining may be carried out in the reaction vessel in the presence of the catalyst with a reaction time corresponding to acceptable catalyst activity drop. Such reaction time is the same for all catalyst particles and insures maximum yield and maximum rate of exploitation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 1b and FIG. 1c are graphs illustrating catalytic effects in accordance with the present invention in contrast with those shown in FIG. 1a;

Description of the preferred embodiments

Figure 1A:
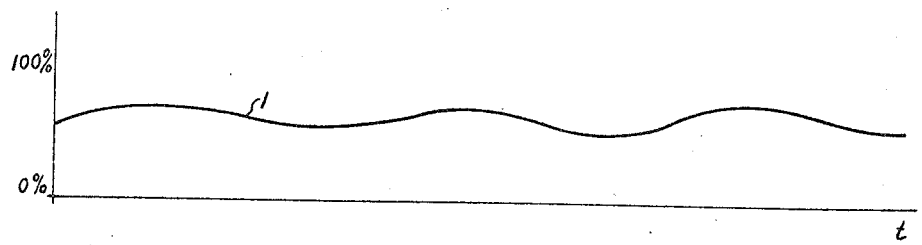
FIG. 1a is a graph illustrating the catalytic effect of the whole catalyst bed in reactors operating according to currently known processes.
Figure 1B:
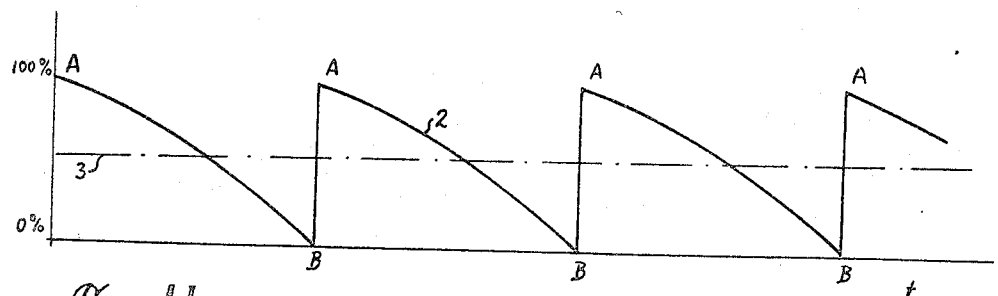
Figure 1C:
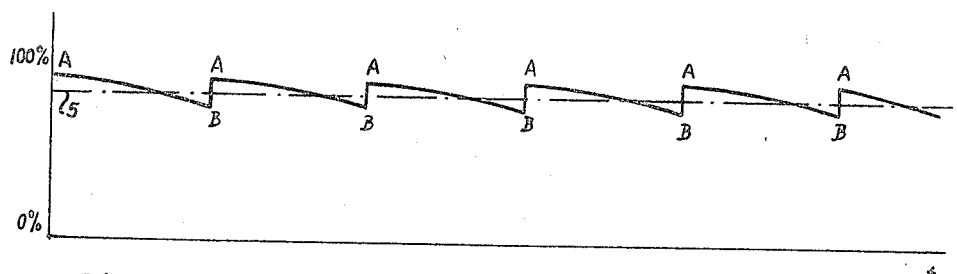

FIG. 1 illustrates in three different graphs the differences between the catalyst activity exploitation in the processes known here before, and the present invention. In each of FIGS. 1a–1c the time values are plotted on the abscissa and the values of the catalyst effect in percentage are plotted on the ordinate.

The curve 1 in FIG. 1 illustrates the catalytic effect of the entire catalyst bed in the type of reactor using the previously known process. If the catalytic effect, that is the activity of the fresh catalyst, is assumed to have the value 100 and that of the spent catalyst is assumed to have the value 0, then the average catalytic effect of the bed is approximately 50. This is the result of the uncontrolled movement of the catalyst wherein the catalyst bed comprises a mixture of particles having a catalytic effect ranging between 0 and 100, based on the fact that parts of the spent catalyst are retained in the reactor together with freshly admitted catalyst whereas parts of the freshly admitted catalyst are discharged with those parts of the spent catalyst which leave the reactor. FIG. 1a refers, of course, to a fluidized-bed process.

Comparing this with FIG. 1b, it will be seen that the curve 2 has upper peaks A and lower peaks B. The peaks A illustrate the catalytic effect of the fresh catalyst whereas the peaks B illustrate the 0 catalytic effect of the catalyst, FIG. 1b being illustrative of the longest cycles of catalyst change in apparatus utilizing the forced catalyst-bed movement according to the present invention. The average catalytic effect is illustrated by the chain line 3, the value of which is again on the order of 50%.

Turning now to FIG. 1c it will be seen that the curve 4 also has peaks A which are upper peaks as well as the lower peaks B. The upper peaks A illustrate the catalytic effect of the fresh catalyst and the lower peaks B the catalytic effect of the catalyst on expiration of the operating time which has been adjusted with respect to the required quality of the resultant product and with respect to the economy of operation. Thus, the curve 4 illustrates the cycles of catalyst change in apparatus utilizing our present invention. Given this adjustment it will be seen that the average catalyst effect, identified by the chain-line curve 5, is near the 100% value.

In other words, a comparison of FIGS. 1b and 1c shows that the catalytic effect of the bed in an apparatus according to our present invention will vary from a value of 50 for the longest cycles of catalyst change to a value of 100 for the shortest cycles of catalyst change. This means that it will always be higher, assuming the same catalyst consumption, than it is possible to obtain with the prior-art approach as exemplified in FIG. 1a.

Figures 2, 3:
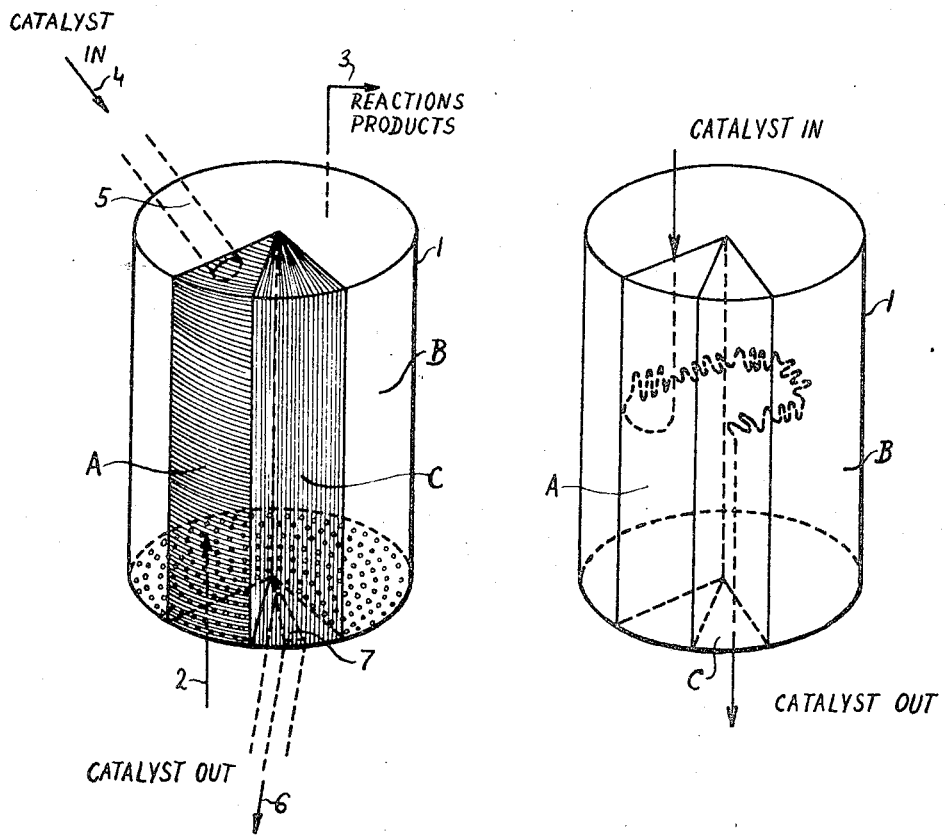
FIG. 2 is a diagrammatic illustration showing the controlled movement of any individual catalyst particle through a reactor vessel utilizing the present invention.
FIG. 3 is a view substantially similar to FIG. 2, but illustrating how the interior of the reaction vessel of FIG. 2 is subdivided into discrete zones.

Coming now to FIG. 2 it will be noted that this diagrammatic figure illustrates for the sake of clarity the movement of a single catalyst particle through the enclosed space constituted by a reactor vessel. Reference numeral 1 identifies such a reactor vessel which, of course, is only shown diagrammatically, and it will be seen that the interior of the reactor vessel is subdivided into three discrete zones which are respectively identified with reference characters A, B and C. A is the inlet zone and it will be seen that the catalyst, or in FIG. 2 a given catalyst particle which is representative of all particles of admitted catalyst, enters the zone A at the upper end thereof. In the manner still to be discussed it moves from the zone A into the zone B which constitutes the reaction zone and wherein the fluidized bed is maintained. In this fluidized bed the catalyst particle performs a motion which is shown by the convoluted portion of the dashed-line particle track shown in FIG. 2. In accordance with the present invention the particle of catalyst is also forced to perform a motion circumferentially of the reactor vessel 1, which latter is of circular or substantially circular cross-section as shown, and how this is achieved will be discussed in more detail subsequently. For an understanding of FIG. 2 it will suffice to point out that during this circumferential motion, which any given catalyst particle undergoes while freely floating in the fluidized bed which is maintained in the zone B, each particle is forced to pass from the zone B into the discharge zone C from whose lower end it is discharged. The introduction and the discharge of the catalyst are clearly indicated in FIG. 2 with respective labels. It will thus be evident from FIG. 2 that any given particle will pass through the zones A, B and C only a single time during a given processing cycle, and this factor applies identically to any and all catalyst particles which are admitted into the zone A. On entering the zone C every particle of catalyst is discharged for regeneration and cannot return into the zone B without having previously been discharged and regenerated. Thus, catalyst particles are retained in the zone B only for the duration of their optimum catalytic effect.

Coming now to FIG. 3, it will be seen that the reaction vessel is again identified with reference numeral 1, and is subdivided into the zones A, B and C which were already indicated in FIG. 2. FIG. 3 is again a diagrammatic illustration.

The lower or bottom wall of the reaction vessel 1 is perforated or otherwise suitably apertured as illustrated, except for the wedge-shaped segment which is shown to be imperforate, but which is provided with the diagrammatically illustrated outlet aperture 7. Subdivision of the interior of the reaction vessel 1 is accomplished through a plurality of vertical baffles which are mounted for rotation about the vertical axis of the vessel 1 and which are so arranged as to subdivide the interior of the vessel into the zones A, B and C. How the rotation of these baffles— in the illustrated embodiment in clockwise direction—is accomplished constitutes no part of the present invention. How this can be done is well known in the art.

Fresh catalyst is introduced through the pipe 5 in the direction of the arrow 4 into the upper end of the inlet zone A. Reaction compounds, e.g. liquid and gaseous hydrocarbons and hydrogen, are introduced in upward flow in the direction of the arrow 2 through the perforate portion of the bottom wall of the vessel 1. The arrow 3 indicates how the liquid and gaseous hydrocarbons and hydrogen reaction products are withdrawn from the upper part of the zone B. The arrow 6 indicates discharge of spent catalyst out of the discharging zone C through the aperture 7 in the bottom wall of the vessel 1.

In the zone B of the vessel 1 a fluidized bed is formed by introduction of a mixture of liquid hydrocarbons, gaseous hydrocarbons and hydrogen, which is a component necessary to perform the hydrocracking reaction, in the direction of the arrow 2 through the perforated bottom wall. This mixture also enters the zone A so that fluidization of the catalyst bed begins as soon as catalyst is introduced in the direction of the arrow 4 into the zone A; fluidization ends when the catalyst enters the discharging zone C.

The velocity of the incoming mixture causes expansion of the catalyst bed. In the course of such expansion all granules of the catalyst are completely separated and a perfect fluidization of catalyst in the two-phase system liquid-solid material is achieved. Gas, specifically hydrogen, is added to this perfectly fluidized two-phase system for processing reasons, not because of the hydrodynamics of the system. For further information concerning fluidization of the bed by admission of a liquid, reference may also be had to N. J. Hasset, "Developments in Application of Fluidization," Chemical Process and Engineering, March 1963, pages 131, 129.

In view of the fact that the quantity of crude partly admitted in liquid phase cannot create a linear stream velocity surmounting the threshold velocity of fluidization, due to the limitation of LHSV (liquid hour space velocity), the necessary quantity of liquid streaming through the catalyst bed is completed by a recycle entering the reactor through the line 9 which will be discussed with reference to FIG. 4 subsequently. The rotary movement of the baffles which subdivide the interior of the vessel 1 into the zones A, B and C is so slow that it does not in the least disturb the fluidizing process, and the term is used only to designate the fact that the fluidized catalyst bed, and thereby the catalyst particles, are forced to perform a circumferential motion with reference to the vessel 1. No intimation of speed is intended.

It is to be noted, lest this be not entirely clear, that the fluidized bed with the catalyst contained therein is maintained only in the zone B; in the zone A the bed begins to form, and in the zone C it is discontinued as a result of the catalyst discharge. The revolving baffles are driven mechanically and not by the existence of a pressure gradient between the individual zones. No pressure control is carried out in the various zones in dependence upon the level of the fluidized bed, such control not being necessary. The catalyst retention time in the zone B is adjustable at will to what amounts to any practically desirable period.

Of course, as already pointed out it is possible to introduce two or more catalysts having different physical and/or chemical properties, in which case a corresponding number of superimposed fluidized beds will be formed. However, this does not affect the concept of the present invention.

Figure 4:
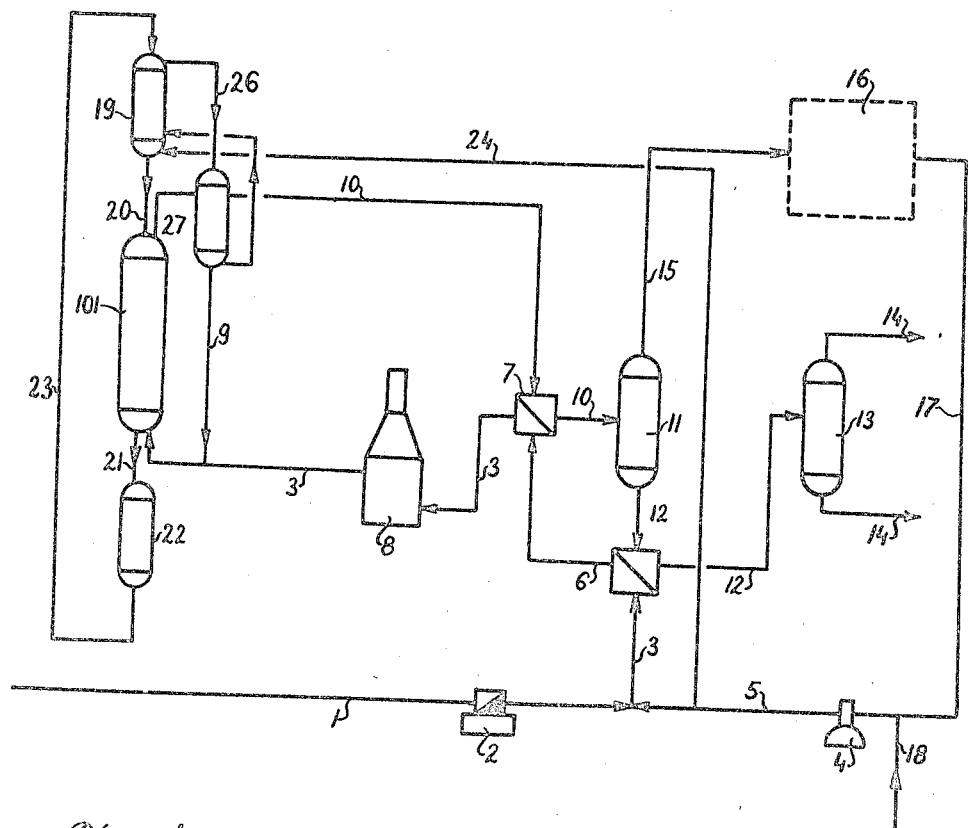
FIG. 4 is a diagrammatic illustration of an installation utilizing our present invention.

Coming now to FIG. 4 it will be seen that therein we have illustrated an exemplary installation utilizing our present invention. The installation in FIG. 4 is assumed to be for the purpose of hydrogenation-desulphuration processing of atmospheric distillation residue. The atmospheric distillation residue, that is the raw material, is introduced by the conduit 1 to the pump 2 from where it is advanced through the conduit 3 to become admixed therein with hydrogen supplied by the compressor 4 and the connecting conduit 5. The mixture passes through the heat exchangers 6 and 7 to the furnace 8 and thereupon enters the reaction vessel 101 (corresponding to the vessel 1 in FIGS. 2 and 3) wherein it undergoes the processing described in detail with reference to FIGS. 2 and 3. The dynamic conditions necessary for catalyst fluidizing are provided with the recirculated liquid coming from line 9.

The reaction mixture leaves the working space of the vessel 1 through the conduit 10 and passes through the heat exchanger 7 to the separator 11 where the liquid and gaseous phase are separated. The liquid phase, i.e. the sulphur-free product, passes through the conduit 12 to the heat exchanger 6 and from there to the expansion vessel 13, to be evacuated therefrom by the conduits 14 which communicate with a non-illustrated storage tank. The gaseous phases separated in the separator 11 are advanced via the conduit 15 to the desulphurating device 16 and therefrom, via the conduit 17 and after the addition of fresh hydrogen, which is introduced through the conduit 18, back to the compressor 4.

The catalyst is introduced into the zone A of the vessel 101 from the doser 19 via the pipe 20 which corresponds to the pipe 5 shown in FIG. 3. The spent catalyst leaving the vessel 101 in the zone C thereof (compare FIG. 3) is led by the conduit 21 to the regenerating device 22 wherein it is regenerated to be readmitted to the doser 19 via the conduit 23.

The doser 19 contains a system of vanes or baffles which are arranged somewhat similar to the ones shown in FIG. 3 with reference to the vessel 1 therein, so that the interior of the doser 19 is subdivided into individual sections each defined between two adjacent vanes. When the catalyst is admitted, the doser 19 is filled with crude oil and its contents warmed step-by-step in the presence of hydrogen. The catalyst in the doser 19 is thus heated directly and slowly to the temperature nearing the reaction temperature by the circulating liquid which enters from the separator 27 through the conduit 25, and which is returned to the separator in the presence of hydrogen admitted from the line 5 downstream of the compressor 4.

Upon warming of the catalyst to substantially 350° C., it is supplied to the zone A of the vessel 101.

Returning to the operation of the vessel 101, or the vessel 1 as it is identified in FIGS. 2 and 3, it should be pointed out that while temperatures of between 200 and 600° C., and pressures of between 30 and 500 atmospheres are within the operative range, in the example utilized in FIG. 4, that is in the exemplary installation shown in FIG. 4 for the purpose of hydrogenation-desulphuration processing of atmospheric distillation residue, temperatures between 420 and 450° C. and pressures between 70 and 100 atmospheres are used, and a continuous reaction leading to desulphuration of hydrocarbons under simultaneous formation of $H_2S$ takes place, and on the surface of the suspended catalyst there further takes place a partial cleavage of heavy hydrocarbons.

In the course of the reaction the pollution and contamination of the catalyst by coke successively takes place, and the catalyst becomes deactivated or spent. The spent catalyst in the space between any two baffles which define between themselves an inlet zone A—it being understood that each of a plurality of such zones successively becomes an inlet zone as it moves into registry with the inlet conduit 5 (compare FIG. 3) and thereupon travels circumferentially until it moves into registry with the opening 7 in the discharge zone C—is transported during revolving of the baffles until it is discharged at the opening 7 in the zone C. This, of course, results in termination of the fluidizing action and discharge of the catalyst, or more particularly the spent catalyst. Of course, all processes in the various zones A, B and C go on simultaneously, that is while the space between two adjacent baffles, which space is currently in registry with the inlet conduit 5 so that this space constitutes the inlet zone A, is being charged with new catalyst, the catalyst in the preceding space which immediately prior thereto was in registry with the conduit 5 and being charged with spent catalyst, advances through the zone B to thereupon advance into the zone C for discharge of the catalyst.

In view of the fact that the materials to be treated often contain considerable amounts of organometals, such as vanadium and nickel, which are strong catalyst poisons, a layer of protective catalyst may be formed under the original layer of catalyst to remove the catalyst poisons. This increases the lifetime of the reaction catalyst. Both catalysts are introduced into the respective zone A simultaneously and they subdivided to form two fluidized beds which are superimpose immediately after the fluidized bed takes shape. This development of two fluidized beds, which has already been discussed earlier, is based upon the different shape, specific weight or chemical properties of the different catalyst particles of the two or more different catalysts.

It is possible to carry a liquid and/or gas of various temperatures and pressures into different parts of the zone B; this makes it possible to carry out several technological processes simultaneously in different parts of the zone B, so that for instances one part of this zone may be partially cooled whereas another part will not be similarly treated.

Catalysts suitable are well known in the art and need not be specifically discussed, it is believed; they include oxides Co—Mo of alumina, as well as iron oxides and bauxite. Particle sizes may for instance be on the order of 0.1 mm.–10.0 mm.

It should be understood that the catalyst is prevented from leaving through the line 10 in FIG. 4, and the liquid product is prevented from leaving through the line 21 in FIG. 4, because the linear speed of the liquid and gas introduced into the reaction vessel is within such limits as to enable expansion and fluidization of the catalyst bed while avoiding the possibility of having the catalyst leaving through the pipeline 10, whereas the fluid product is prevented from exiting through the pipeline 21 because a closing device provided at the bottom of the discharge prevents such a possibility. Details of the closing device are not at issue in the present invention.

By way of a working example it may be pointed out that in such an example the atmospheric residue had a sulphur content of 4–6%. The volume velocity for crude was 1–5, the circulatory gas rate ($H_2$) was 1300–2500 $nm.^3/m.^3$. As a catalyst Co, Mo on alumina was used. The pressures ranged between 80 and 150 atmospheres and the degree of desulphurization and of conversion was between 50 and 90%. These figures refer to the capacity of the entire reactor vessel, because the character of the process makes it impossible to relate the figures to the capacity of the individual zones.

It will be understood that each of the elements described above, or two or more together, may also find a useful application in other types of applications differing from the types described above.

While the invention has been illustrated and described as embodied in a method for carrying out continuous fluidized-bed catalytic hydrorefining and/or catalytic hydrocracking, it is not intended to be limited to the details shown, since various modifications and structural changes may be without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:
1. A method of carrying out continuous fluidized-bed catalytic hydrorefining and/or catalytic hydrocracking of crude oil or tar, their distillation components and analogous substances, comprising a processing cycle including the steps of continuously admitting at least one catalyst into a discrete inlet zone of an enclosed space; transferring the thus-admitted catalyst into a discrete reaction zone of such enclosed space and moving the catalyst through said reaction zone from an inlet to an outlet thereof; continuously admitting into the reaction zone a substance to be treated with said catalyst and continuously effecting fluidization of the catalyst during movement thereof through said reaction zone from said inlet to said outlet so that reaction with the substance to be treated takes place in said reaction zone and the catalyst becomes spent; and transferring the spent catalyst from said reaction zone to a discrete discharging zone of said space, and discharging the spent catalyst from said space in said zone, whereby the catalyst passes through the respective zones in regulated and forced motion only once during a processing cycle.

2. A method as defined in claim 1, wherein said enclosed space is of substantially circular cross-sectional outline, said method comprising compelling the catalyst substance to move circumferentially of said enclosed space from said inlet zone to said outlet zone.

3. A method as defined in claim 2, the step of continuously effecting fluidization comprising maintaining in said reaction zone at least one fluidized bed.

4. A method as defined in claim 3; comprising maintaining the fluidized bed at a temperature in the range between substantially 200° C. and substantially 600° C.

5. A method as defined in claim 4; further comprising maintaining the interior of said reaction zone at a pressure substantially in the range between 30 and 500 atmospheres.

6. A method as defined in claim 1, the step of continuously effecting fluidization comprising maintaining in said reaction zone at least one fluidized bed.

7. A method as defined in claim 6; further comprising the steps of continuously admitting into said inlet zone at least one additional catalyst having properties different from the first-mentioned catalyst; continuously transferring the additional catalyst together with the first-mentioned catalyst into said reaction zone and moving the additional catalyst together with the first-mentioned catalyst through said reaction zone from said inlet to said outlet thereof; continuously maintaining in said reaction zone an additional fluidized bed at a level different from the first-mentioned fluidized bed, each bed including one of said catalysts; and continuously transferring the spent catalysts to said discharging zone and discharging the spent catalysts from said discharging zone.

8. A method as defined in claim 7, said enclosed space having an upper and a lower end, and said fluidized beds being horizontal beds which are vertically superimposed.

9. A method as defined in claim 1, said enclosed space having an upper and a lower end and said zones constituting vertical subdivisions of said space; the step of admitting catalyst into said inlet zone comprising admitting the catalyst at the upper end of such inlet zone, and the step of effecting fluidization of the catalyst comprising admitting said substance and requisite fluidizing medium under pressure at the lower end of said reaction zone and in direction towards the upper end of the latter.

10. A method as defined in claim 9; further comprising the step of continuously evacuating reaction products from said reaction zone at the upper end of the latter.

References Cited

UNITED STATES PATENTS

| | | | |
|---|---|---|---|
| 2,246,654 | 6/1941 | Arveson | 208—176 |
| 2,502,953 | 4/1950 | Jahnig | 208—155 |
| 2,895,906 | 7/1959 | Harper | 208—164 |

HERBERT LEVINE, Primary Examiner

U.S. Cl. X.R.

23—288; 208—157, 164, 250, 264